United States Patent [19]

Newton

[11] 4,337,757
[45] Jul. 6, 1982

[54] SOLAR HEAT COLLECTION AND STORAGE SYSTEM

[76] Inventor: Alwin B. Newton, 136 Shelbourne Dr., York, Pa. 17403

[21] Appl. No.: 109,799

[22] Filed: Jan. 7, 1980

[51] Int. Cl.³ .................................................. F24J 3/02
[52] U.S. Cl. ...................................... 126/437; 126/422
[58] Field of Search ............... 126/422, 428, 430, 437, 126/442; 165/485; 285/153; 137/176, 583, 588, 589

[56] References Cited

U.S. PATENT DOCUMENTS

| 4,000,851 | 1/1977 | Hellemann | 126/422 |
| 4,034,738 | 7/1977 | Barber, Jr. | 126/428 |
| 4,171,617 | 10/1979 | Sakamoto et al. | 60/641 |
| 4,194,493 | 3/1980 | DeGrijs | 126/442 |

FOREIGN PATENT DOCUMENTS 1533804 11/1978 United Kingdom ................. 126/422

OTHER PUBLICATIONS

"Solar Heating Systems Design Manual", Fluid Handling Division ITT, 1976 pp. 4-8 to 4-15.

Primary Examiner—Samuel Scott
Assistant Examiner—Lee E. Barrett
Attorney, Agent, or Firm—C. Hercus Just

[57] ABSTRACT

A closed solar energy collection and storage system comprising one or more solar heat collector units in parallel, feed and return headers at lower and upper levels at the opposite ends thereof, a liquid storage tank at a level below said units, a circulating pump connected to said tank, a first conduit between said pump and the lower feed header, a second conduit extending downward from said upper return header into said tank, a return vent extending from said upper return header to the top of said tank for passage of air or gas or steam thereto from said collector or tank to receive and condense steam or vapor received therefrom and return the condensate to said tank.

11 Claims, 5 Drawing Figures

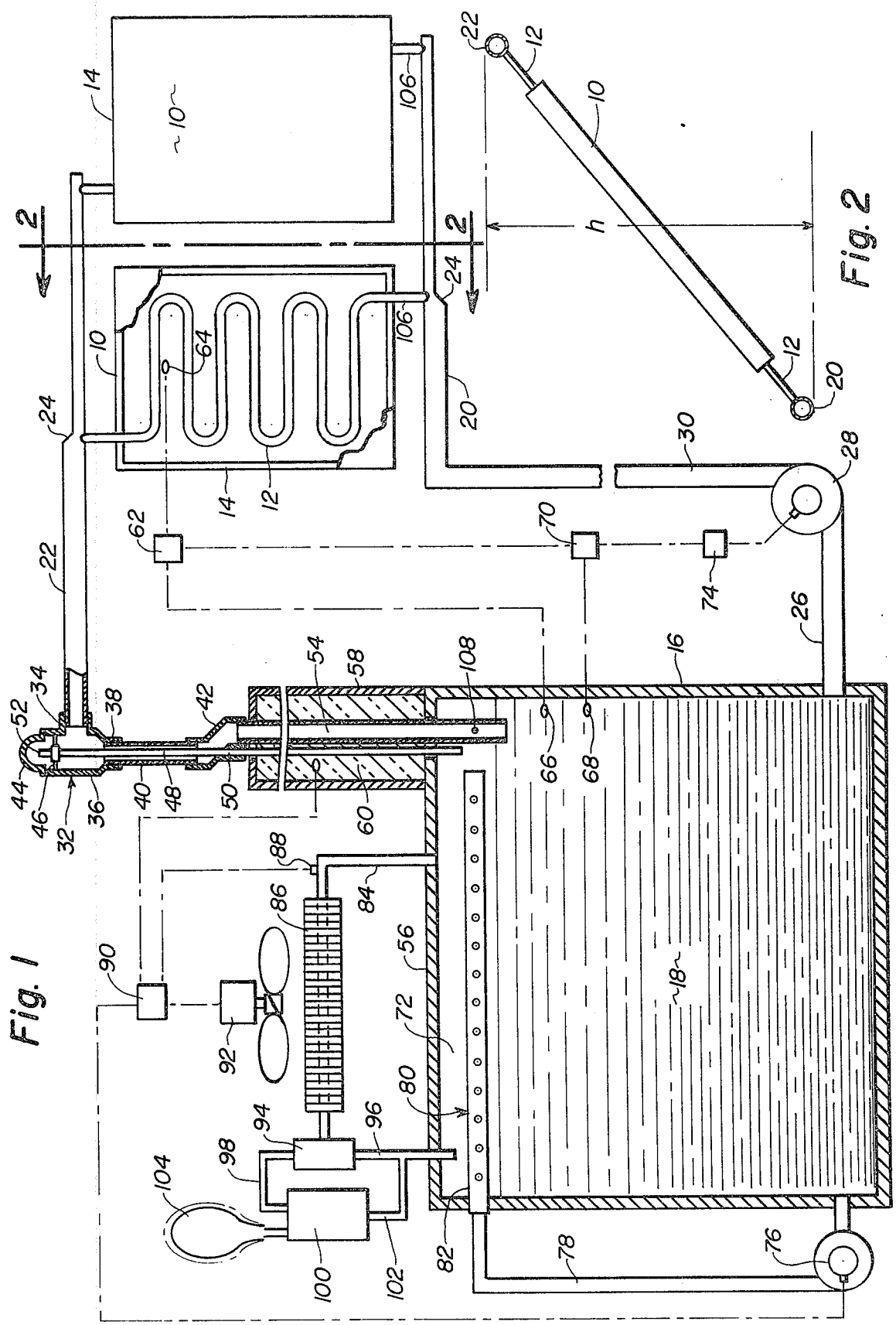

SOLAR HEAT COLLECTION AND STORAGE SYSTEM

BACKGROUND OF THE INVENTION

The present invention primarily is concerned with providing a solar heat collection and storage system which is closed and is provided with means to effectively deal with various conditions of the liquid which primarily is stored in a storage tank and which is also heated by one or more solar heat collecting units interconnected with said storage tank. On occasions, particularly when the system for heating the interior of a closed space, such as a dwelling or otherwise, does not lower the temperature of the liquid in the storage tank to such extent that it requires additional heating by the solar collecting units, said units, in the meantime, will be exposed to substantial solar heat. Under such conditions, liquid from the storage tank, upon passing to such heating solar heat collecting units, frequently is at least partially transformed into steam and said steam, together with heated liquid is circulated through the system and is transmitted back to the storage tank by appropriate conduits.

At least a few previous attempts have been made to transmit steam from solar heat collector units back to a storage tank, one such example being illustrated in U.S. Pat. No. 4,044,949 to Morawetz, dated Aug. 30, 1977. Said system is a so-called closed system and several examples of closed systems per se are illustrated in applicant's prior U.S. Pat. No. 2,342,211, dated Feb. 22, 1944, and his more recent U.S. Pat. No. 4,114,600, dated Sept. 19, 1978. In the latter patent, there is a disclosure of means to handle inert gas developed in the system and passed from the solar heat collectors to the storage tank but neither this patent nor the Morawetz patent include any means for specifically and effectively condensing steam or vapor developed in the system under the above-described circumstances and it is the principal purpose of the present invention to provide an effective means for condensing such steam or vapor and otherwise providing improvements over the systems found in said aforementioned patents, as well as other similar art.

SUMMARY OF THE INVENTION

It is among the principal objects of the present invention to provide a closed solar energy collection and storage system in which one or more collector units are provided at opposite ends with feed and return headers respectively connected to lower and upper levels of said collector units and in particular provide a return conduit extending downwardly from the upper return header primarily for delivering heated liquid into said tank and, in addition, provide a return vent also extending from the upper return header to the top of the storage tank for passing air and/or steam, as well as any other vapor separately to the upper portion of the storage tank and delivering it preferably above the liquid level therein, whereby the liquid and air or steam are delivered separately to the upper portion of the storage tank from the upper return header of the solar heat collector units.

Another object of the invention is to provide an improved separator unit in conjunction with said upper return header and downwardly extending return conduit and said return vent to facilitate the separation of air and steam from the liquid.

A further object of the invention is to provide condensating means operable relative to the upper portion of the storage tank to receive concdensable gaseous matter, including steam, and condense the same for return to the liquid in the tank.

Still another object of the invention is to provide in the upper portion of the storage tank a spray device connected by suitable conduit means to the main body of liquid in the storage tank and including a pump operable to deliver liquid from said tank to the spray device in the upper portion thereof and thus facilitate the cooling of gases and air delivered thereto from the upper return header of the solar heat collecting units, said pump being in addition to the primary circulating pump which forces liquid from the storage tank to the feed header connected to the solar storage collector units.

Still further improvements comprise the provision of various sensing controls for initiating operation of the aforementioned spray device and/or the condensing system, whereby operation of such closed system is rendered automatic and foolproof.

One further object of the invention is to provide a breather conduit connected to the top of a storage tank for passage of air or other gases to and from said tank above the liquid level therein as the volume of air or other gases varies and said breather conduit being connected to a collector which is operable to receive any liquid passing through said breather conduit and including means to return said liquid to the tank and said breather conduit also being associated with means to prevent the inlet of ambient air or atmosphere to the system.

Still another important object of the invention is to provide a liquid and gaseous separator between the return conduit and the downwardly extending liquid return conduit and vent for gas and steam, said separator being so constructed as to initially separate steam and gaseous matter from the liquid but, when said steam and any other gaseous matter has been exhausted from the return header, liquid may thereafter pass through the vent and be delivered thereby into the upper part of the storage tank, together with other liquid delivered thereto by the liquid conduit, thereby imposing a pull by gravity upon such discharging liquid to facilitate the operation of the circulating pump which delivers liquid from the tank to the feed header for the solar collector unit.

One further object ancillary to the foregoing object is forming said separator from relatively simple means comprising a tee in which the stem is disposed horizontally and the head is vertical, said stem being connected to the delivery end of the return header from the solar collector units and the liquid discharge pipe being connected to the lower end of the vertically disposed head of the tee, the upper end of the vent for gas and steam also extending upward through said vertical head of the tee and terminating at a level above the inlet of the stem of the tee, said upper end of the tee also being closed but spaced from the upper end of said vent.

Still another object of the invention is to provide a modified circuit for the return of gas or air to the upper return header from a receiving compartment connected with the condensing unit rather than from the space above the liquid level in the storage tank and thereby minimize the inclusion of any appreciable amount of steam or water in such returning gas or air which could be frozen in the collector in freezing temperature conditions.

One further object of the invention is to provide a second embodiment of fitting for said separator which facilitates the connection of conduits thereto.

Details of the foregoing objects and other objects, as well as the invention, are set forth in the following specification and illustrated in the accompanying drawings comprising a part thereof:

BRIEF DESCRIPTION OF THE DRAWINGS

FIG. 1 is a schematic side elevation, partly in vertical section and certain parts also being broken away for purposes of illustrating details of a closed solar energy collection and storage system embodying the principles of the present invention.

FIG. 2 is a side elevation of part of the solar energy collection units shown in FIG. 1, as seen on the line 2—2 thereof.

DETAILED DESCRIPTION OF THE PREFERRED EMBODIMENTS

Figure 3:
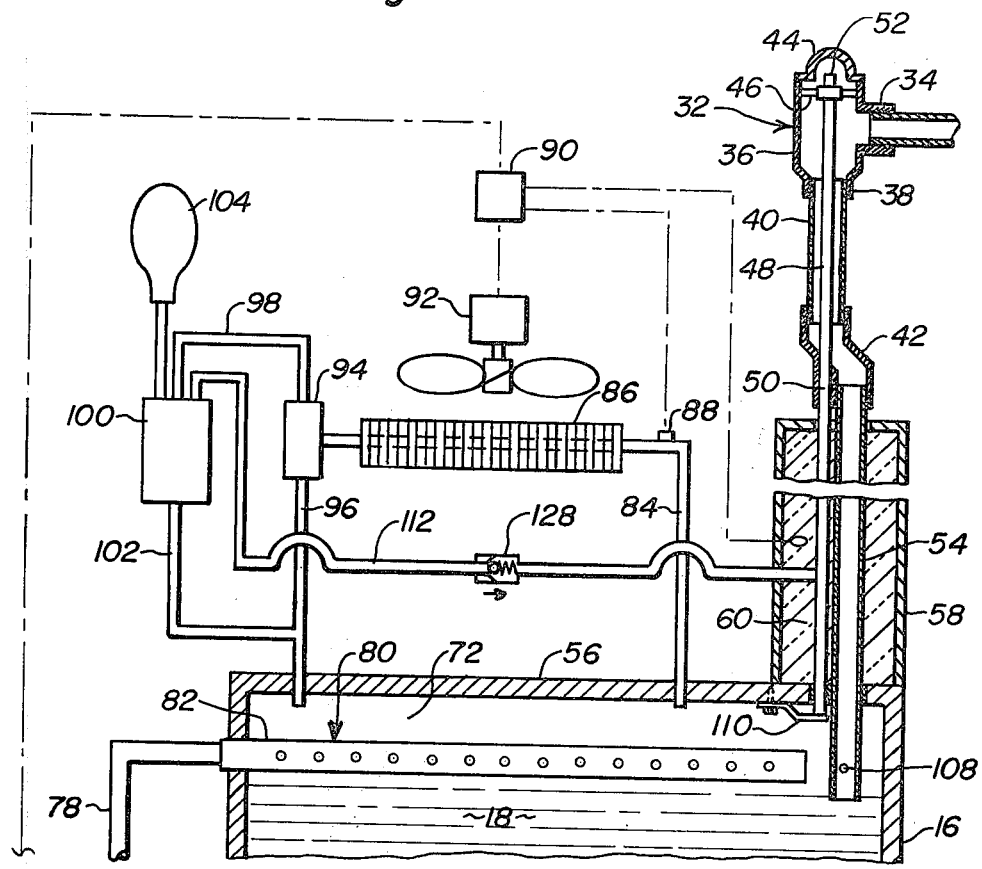
FIG. 3 is a fragmentary portion of FIG. 1 to which additional means have been added for transmitting return air or gas to the return header for the collector units.

The closed solar energy collection and storage system comprising the present invention is illustrated primarily in FIG. 1. In said figure, there is illustrated a plurality of solar heat collector unit 10, which respectively include sinuous coils 12, through which fluid, and particularly water, for example, circulates for purposes of being heated by solar energy. Said units include a frame 14 within which the coils 12 are mounted and, as seen from FIG. 2, it is conventional to mount said units at an angle to the horizontal and one such exemplary angle is shown in said figure.

The system also includes a storage tank 16 of substantial volume, which is shown in vertical section in FIG. 1, and it will be understood in view of the break-away regions shown in FIG. 1 that the preferred arrangement of the system includes the positioning of the solar heat collector units 10 mounted in vertically spaced relationship with respect to the tank 16, and usually at a very substantial distance above said tank. Said tank contains the liquid 18 that is heated by solar energy passing through the coils 12 of the units 10. For purposes of such circulation, the lower ends of the coils 12 are connected commonly to a horizontal feed header 20 and the upper ends thereof are connected commonly to a return header 22. For purposes of effecting substantially even flow from the various units 10 to these headers, the same are provided with appropriate reducing steps 24 adjacent the connection of the coils 12 of the left-hand collector unit 10 to said headers. Outlet conduit 26 communicates at one end with the lower portion of tank 16 and leads to a first pump 28, said pump having a first delivery conduit 30 extending therefrom to the feed header 20 for purposes of delivering liquid 18 from the storage tank 16 to said feed header.

The return header 22 communicates with a fitting 32 which actually comprises a tee, the stem 34 of said tee 32 being connected to the discharge end of return header 22, while the head 36 of the tee 32 extends vertically and the lower end 38 of the head 36 is connected to the upper end of a second conduit 40, the lower end of said conduit being connected to the upper end of a Z-shaped fitting 42. The upper end of the head 35 of tee 32 extends to a level above the return header 22 and is closed by a suitable closure 44 which preferably is dome-like.

Within the upper portion of the head 36 of tee 32, a spider 46 is fixedly connected for purposes of supporting the upper end of a vent tube 48 which extends vertically downward through the second conduit 40 and also passes in sealed relationship through an opening 50 in the fitting 42. The upper end 52 of the vent tube 48 comprises the inlet end of said vent tube and said vent tube extends downward, alongside an extension return conduit 54, the lower end portion of said extension return conduit 54 passing through an appropriate opening in the top 56 of tank 16, the lower end of vent tube 48 also extending through an appropriate opening in said top 56 of the tank, preferably in close proximity to the conduit 54. Conduit 54 also is known in the art as a downcomer and the conduit 54, as well as vent tube 48 are disposed within an enclosure 58, which is filled with heat insulating material 60, the enclosure 58 preferably resting at its lower end upon the top 56 of tank 16, as clearly shown in FIG. 1.

Control of the circulation of liquid 18 within the system primarily is effected by differential temperature control unit 62, which is illustrated adjacent the left-hand heat collector unit 10 and a sensing element 64 is disposed within said left-hand unit 10 and is also connected to the control unit 62, as clearly shown diagrammatically. An additional sensing unit 66 is disposed in the upper portion of tank 16 and it also is connected to control unit 62, as shown diagrammatically in FIG. 1. A still further sensing element 68 is mounted within the interior of tank 16 and extends to an additional control unit 70 exteriorly of said tank and the same also is connected by a circuit to the differential temperature control unit 62, as likewise is shown in FIG. 1.

In the preferred operation of the system, the level of liquid 18 in tank 10 is below the top 56 of the tank, whereby a space 72 is present in the tank above the liquid level. The circuit between the additional control units 70 and first pump 28 includes a timer 74 having adjustable settings, the purpose of which is described hereinafter.

Operation of the pump 28 is controlled by the differential control unit 62, operation of the pump occurring when the sensor 64 in the heat collector unit 10 is at a predetermined amount above the temperature of the liquid in storage tank 16, as determined by sensor 66. Pump 28 is stopped whenever the differential temperature falls below a predetermined minimum as measured by the sensors 64 and 66 which cause the control unit 62 to operate. Pump 28 also is prevented from operating whenever the storage temperature exceeds a predetermined maximum, such as, for example, 203° F. (95° C.), as determined by still further sensing element 68, mounted within tank 16 and connected to an additional control unit 70 which also is connected to the differential temperature control unit 62 and measures storage temperature by means of said sensing element 68.

When pump 28 stops, liquid returns through the pump to drain the upper return header 22, as well as the collectors 10 and feed header 20 and the first delivery conduit 30. During this time, the space 72 above the fluid 18 in storage tank 16 is vented by tube 48 to header 22, whereby rapid draining of the aforementioned connected elements can occur, due to air or gas from space 72 filling the headers 20 and 22 and collectors 10.

From FIG. 1, it also will be seen that vent line 48 is in close proximity or actually may be in contact with extension return conduit 54, which, incidentally, is known in the art as a downcomer.

Upon re-starting pump 28, following the draining of the system as described immediately above, sufficient head must be developed by the pump to fill the delivery conduit 30, feed header 20, the collectors 10 and return header 22, and this may be accomplished either by choosing a pump with a steep curve of head vs. flow or by running the pump 28 at a high speed for the required fill time, as determined, for example, by aforementioned timer 74, which is connected in the control circuit for the pump as shown in FIG. 1 and then reverting to normal speed of the pump. During such refilling of the system, air is vented from all of the connected elements recited above through the vent tube 48 and into the space 72 in tank 16. If, before refilling the system, the collectors 10 have stagnated and are sufficiently hot from absorbed solar heat that steam is generated incident to passing liquid through said collectors, said steam passes through return header 22 through the vent tube 48 and into space 72 above the liquid in tank 16. The differential control unit 90 senses the steam temperature above some predetermined minimum amount in vent tube 48, such as 203° F. (95° C.), and starts operation of a second pump 76, which communicates with the lower portion of tank 16, as shown in FIG. 1 and forces said cooler liquid through delivery conduit 78 to a temperature-reducing device 80, which is in the form of a perforated tube 82 and comprises a spray which tends to condense the steam and the condensate falls into the liquid 18 in tank 16. If the steam is not entirely condensed, any excess is vented from space 72 through conduit 84 to a condensing unit 86, which, as illustrated in FIG. 1, comprises a finned coil, for example, and an additional sensor 88, which is connected to a further temperature-responsive control unit 90, initiates operation of a cooling fan 92 to blow cooling air over the finned coil of condensing unit 86 and thereby, condensing steam passing therethrogh, the condensate from said unit 82 passing to an appropriate separator 94, which, in turn, is connected to downwardly extending conduit 96 for discharge of the condensate into the upper part of tank 16.

The above-described condensing mechanism also is provided with a breather pipe 98 into which air from space 72 in tank 16 may pass by also moving through separator 94 as the volume of air in the space 72 changes. A closed receiving compartment 100 is connected to the discharge end of breather pipe 98 and any liquid which might accompany the air is permitted to be received in the compartment 100 and, by means of a return conduit 102, passes back to the upper part of tank 16. Further, an appropriate means for preventing any intake of atmospheric air to the compartment 100 is provided in the form of an exemplary expansible member, such as an appropriate balloon 104, or other suitable means, thereby insuring that the entire system is closed from beginning to end.

Under the foregoing circumstances, after all steam has ceased to be generated, such as following a refilling of the collector units 10, as described above, and passes from the return header 22 and down the vent tube 48 into space 72 in the upper part of tank 16, the return system to tank 16 will be drained of steam, whereby continued flow of liquid from the return header 22 will fill the fitting 32 with liquid to such an extent that it will overflow into the upper end 52 of vent tube 48, whereby vent tube 48 also will carry liquid from the return header 22 in addition to the return conduit 54, thereby subjecting such returning liquid to the influence of gravity that places a pull upon such returning liquid incident to entering tank 16 and thus, facilitating the movement of such liquid in such manner that the operation of pump 28 may operate at its normal lower head circulation rate. Simultaneously, such returning of the liquid through the vent tube 48 and return conduit 54 causes the control unit 90 to stop the pump 76 and cooling fan 92.

The general tapering of the feed and return headers 20 and 22, coupled with the reducing steps 24 limits the changes in velocity head to values in each section which prevent major differences in flow rate in individual collectors and also to retain similar velocity pressure ranges in each of the feed and return conduits.

As indicated above, it is preferred that the collector units 10 be disposed at any angle, as indicated in exemplary manner in FIG. 2, in order to produce a head "h" and the feed header 20 is at the lower elevation, while the return header 22 is at the upper or higher elevation, as also shown in FIG. 1. If, during the filling of the collector units 10 in the manner described above, pressure drop and normal flow in the system is not equal to or greater than the head "h", additional resistance may be provided in the connectors 106 through which the coils 12 in the units 10 communicate with the feed header 20 in order to provide the required head to fill all headers simultaneously. Also, as a safety precaution, the lower end of return conduit 54 may be provided with a suitable vent hole 108 within the space 72 in the upper portion of the tank 16 to prevent trapping the flow of liquid through return conduit or downcomer 54 into tank 16.

Referring to FIG. 1, it will be seen that vent tube 48 extends into space 72 above the liquid level in tank 16, whereby when air or gas is vented through vent tube 48 to the headers 20 and 22 and collectors 10, it is conceivable that some water vapor can be entrained in the air or gas thus vented and when said headers and collectors are exposed to freezing temperatures, freezing of such vapor in this portion of the system can occur. Hence, to at least minimize but preferably prevent such occurrence, attention is directed to FIG. 3 in which additional passage and control means are illustrated for the following purposes.

Figure 4:
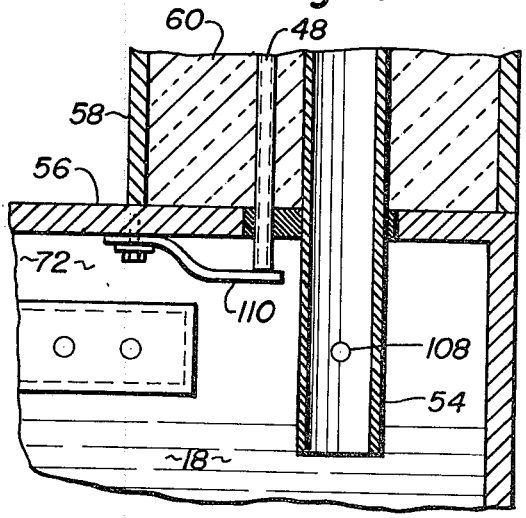
FIG. 4 is an enlarged fragmentary, vertical section of a portion of the venting system of FIG. 3 to show details of a check valve more clearly than in FIG. 3.
Figure 5:
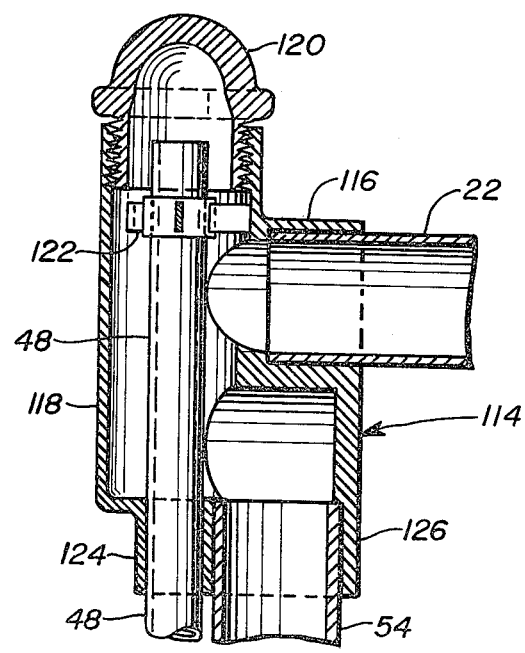
FIG. 5 is a vertically sectioned fitting comprising an alternative to the fitting of the separator shown in FIG. 1.

In FIGS. 3 and 4, it will be seen the lower end of vent tube 48 has been arranged to be subjected to control by a check valve 110 which has been illustrated as a simple resilient leaf spring, to represent any suitable type of check valve, which will normally be closed but readily capable of being opened to permit passage of air or gas into space 72 of tank 16, as when the collectors 10 are being filled by pump 28, see FIG. 1, drawing liquid from tank 16 for that purpose. Similarly, liquid flowing from the return header 22 into fitting 32 until it fills it will discharge liquid down vent tube 48 into tank 16 in a manner to hold said check valve open. Under neither of these situations, however, will backflow occur through the check valve 110.

In order that venting of air or gas to the headers 20 and 22 and collectors 10 can occur when necessary, the modified arrangement illustrated in FIG. 3 includes an additional bypass vent tube 112 which extends between receiving compartment 100 and vent tube 48 midway of its length, as clearly shown in FIG. 3. Due to the fact that compartment 100 normally is colder than tank 16, it contains minimum water vapor because of free drainage of condensate through return conduit 102 to tank 16 and therefore, air or gas drawn from compartment 100 will have a minimum of water vapor in it, if any at all, and the air therefrom when in the headers 20 and 22 or collectors 10, will present no freezing problems of the type referred to hereinabove. The temperature of the liquid in tank 16 in winter will vary during the season and with geographic location but, for example, it normally will be substantially greater than room or ambient outdoor temperatures. In typical installations, the maximum temperature of liquid in tank 16 during winter will range, for example, from 130° F. to 185° F. among various installations.

The operation of the system as just described results in much less water vapor entering the collectors than if the gases to refill them are drawn from the space above the water within the main storage tank 16. This is illustrated by the following table which shows the weight in pounds of water vapor in saturated air per cubic foot at various temperatures:

| Temperature | Lbs. Water Vapor/cu. ft. |
| --- | --- |
| 80F | 0.00124 |
| 120F | 0.00412 |
| 140F | 0.00678 |
| 155F | 0.01038 |
| 186F | 0.021429 |

Thus, in geographic areas in which freezing temperatures occur, and if the storage temperatures during freezing conditions are likely to go above 155° F., for example, the arrangement in FIG. 3 is preferable since the temperature in compartment 100 is usually approximately the same as room temperature, and hence, will be close to 80° F. Normally, the time interval between drainage of the collectors and a re-start of the system is usually several hours, and therefore, even if compartment 100 shoud be warmed during drainage, its temperature would, nevertheless, approach room temperature before re-starting. Additional check valve 128, shown in FIG. 3, prevents backflow and is optional.

Referring to FIG. 4, an alternative type fitting for the fitting 32 in FIGS. 1 and 3 is shown for purposes of eliminating the second conduit 40 and Z-shaped fitting 42. The alternative fitting 114 is a casting comprising a modified tee in which the stem 116 is horizontal to connectably receive one end of return header 22. The head 118 is vertical and the upper end has a cap 120 threaded thereinto, the lower end of the cap having a spider 122 which receives and supports the upper end of vent tube 48 at a level above stem 116 and header 22. The lower end of the head 118 has a pair of suitable outlet ports, the port 124 connectably receiving the upper end of vent tube 48 and the port 126 threadably receiving the upper end of extension return conduit 54, whereby the second conduit 40 and Z-shaped fitting 42 are eliminated.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. A closed solar energy collection and storage system comprising in combination, one or more solar heat collector units extending upward from lower to an upper level, feed and return headers respectively connected to said lower and upper levels of said collector units at the opposite ends thereof for simultaneous circulation therethrough, a liquid storage tank at a level below at least said upper return header, a circulating pump, means connecting said pump to the lower part of said tank, a first conduit between said pump and said lower feed header, a multiple jet spray device in the upper portion of said tank to condense any steam present therein, a second pump connected to said tank at a level to receive liquid from said tank, and a conduit between said second pump and spray device to operate said spray for condensing any steam or vapor passed to said tank by a return vent, and a second conduit extending downward from said upper return header into liquid in said tank, and a return vent extending downward from said upper return header coaxially through at least a portion of said second conduit to the top of said storage tank for passage of air and/or gas or steam therebetween.

2. The system according to claim 1 further including a sensing control adjacent said return vent and connected to a source of power for said second pump to operate the same and conduct liquid to said spray device when steam in said return vent reaches a predetermined high temperature limit and also operable to stop said second pump when the temperature in said return vent is decreased to a predetermined low limit for which said control has been set to operate.

3. The system according to claim 1 further including a supplemental air-cooled condensing device having conduit means at opposite ends communicating with the upper part of said tank and operable to receive steam from said tank and condense it and return the condensate to said tank.

4. The system according to claim 3 in which said condensing device comprises a heat exchanger and a fan adjacent the same operable to blow ambient atmospheric air onto said exchanger to condense steam therein.

5. The system according to claim 1 wherein said headers are substantially horizontal and said headers having reducing steps therein between the connections of successive heat collector units to said headers to limit changes in velocity heads to values in each section which prevent appreciable differences in flow rate in the several collectors.

6. The system according to claim 1 further including a condensing device provided with conduit means at opposite ends each communicating with the space in the upper part of said tank and operable to receive steam from said tank when contained therein and condense it and return the condensate produced thereby to said tank, a compartment connected to said condensing device by conduit means and also connected to the upper portion of said storage tank by additional conduit means to permit air to be received from said tank as the volume of air therein increases, a return conduit connected between said compartment and top of said storage tank to conduct any water occurring in said compartment to said tank, whereby air in said compartment is relatively free from moisture and is cooler than air in the space above the liquid in said storage tank, an additional by-pass vent tube extending between said compartment and said return vent which extends between said upper return header and the top of said storage tank, and a check valve on the lower end of said return vent operable to prevent air or gas from the space in said storage tank from being vented to said feed and return headers and collector units when the system is being drained during cycling operation of said collector units but receive relatively vapor-free air or gas from said compartment during such drainage and thereby minimize the possibility of water vapor condensing and freezing in said collector units and headers when subjected to freezing temperatures.

7. The system according to claim 6 further including a separator unit operable to separate water vapor from air and gas and connected between said condensing device and the space in the upper portion of said tank, and conduit means between said separator unit and said compartment and operable to act as a breather connection therebetween and also transmit relatively moisture-free air or gas to said compartment which is available for passage to said return vent for transmission to said headers and collector units as aforesaid.

8. The system according to claim 1 further including a compartment positioned at a higher level than said storage tank, additional conduit means and connected between said compartment and the upper portion of said storage tank to permit air to be received in said compartment from said tank as the volume of air in said tank increases, a return conduit connected between said compartment and top of said storage tank to conduct to said tank any water occurring in said compartment, whereby air in said compartment is relatively free from moisture and is cooler than air in the space above the liquid in said storage tank, an additional bypass vent tube extending between said compartment and said return vent which extends between said upper return header and the top of said storage tank, and a check valve on the lower end of said return vent operable to prevent air or gas from the space in said storage tank from being vented to said feed and return headers and collector units when the system is being drained during cycling operation of said collector units but receive relatively vapor-free air or gas from said compartment during such drainage and thereby minimize the possibility of water vapor condensing and freezing in said collector units and headers when subjected to freezing temperatures.

9. A closed energy collection and storage system comprising in combination, one or more solar heat collector units extending upward from a lower to an upper level, feed and return headers respectively connected to said lower and upper levels of said collector units at the opposite ends thereof for simultaneous circulation therethrough, a liquid storage tank at a level below at least said upper return header, a circulating pump, means connecting said pump to the lower part of said tank, a first conduit between said pump and said lower feed header, a second conduit constituting a downcomer and extending downward from said upper return header into liquid in said tank, a return vent extending downward from said upper return header coaxially through at least a portion of said second conduit to the top of said storage tank above the liquid level therein for passage of air and/or gas or steam between said upper header and storage tank, said second conduit being connected at the upper end thereof to a first fitting and said upper return header also being connected to said first fitting for communication with the upper end of said second conduit for passage of liquid from said upper return header to the top of said tank, a second fitting intermediately of the opposite ends of said second conduit through which said return vent extends exteriorly of a depending extension of said second conduit, and said return vent being elongated and adjacent said depending extension and also extending at the upper end thereof upwardly into said first fitting to a level above the inlet therein from said upper upper return header, whereby air and/or gas can pass down said vent into the top of said tank above the liquid level therein.

10. The system according to claim 9 further including insulation commonly surrounding said depending extension of said second conduit and elongated return vent.

11. The system according to claim 9 in which said upper return header and first fitting are at a predetermined level above said tank and the upper ends of said second conduit and elongated return vent are closely parallel to each other and extend downward from said first fitting and upper return header, the upper end of said return vent being disposed in said first fitting at a level slightly above said upper return header to vent air and gasses therefrom, said upper return header being connected to said first fitting transversely thereto and intermediately of the upper and lower ends thereof to discharge liquid and any intermixed air or gas into said fitting under pressure and incidental turbulence to permit separation of said air or gas from the liquid in said fitting for passage of the air or gas down said vent to said tank above the liquid level therein until exhaustion of air or gas from said liquid, whereupon the turbulence of liquid in said first fitting will cause liquid under pressure to at least somewhat flood said fitting and thereafter cause discharge of liquid down said vent and into said tank by gravity to produce a suction-like pulling force upon the liquid returning through said vent and also through said second return conduit to said tank when said circulating pump connected to said first conduit is operating and thereby minimize the head required to be produced by said pump in circulating liquid through said heat collectors and headers.

* * * * *